(12) United States Patent
Masciantonio et al.

(10) Patent No.: US 10,207,334 B2
(45) Date of Patent: Feb. 19, 2019

(54) VIBRATORY MACHINING DEVICE

(71) Applicants: CENTRE TECHNIQUE DES INDUSTRIES MÉCANIQUES, Senlis (FR); AMVALOR, Paris (FR)

(72) Inventors: Ugo Masciantonio, Proville (FR); George Moraru, Aix-en-Provence (FR)

(73) Assignees: CENTRE TECHNIQUE DES INDUSTRIES MECANIQUES (FR); AMVALOR (FR)

( * ) Notice: Subject to any disclaimer, the term of this patent is extended or adjusted under 35 U.S.C. 154(b) by 0 days.

(21) Appl. No.: 15/521,038

(22) PCT Filed: Oct. 20, 2015

(86) PCT No.: PCT/FR2015/052818
§ 371 (c)(1),
(2) Date: Apr. 21, 2017

(87) PCT Pub. No.: WO2016/062964
PCT Pub. Date: Apr. 28, 2016

(65) Prior Publication Data
US 2017/0355026 A1 Dec. 14, 2017

(30) Foreign Application Priority Data
Oct. 22, 2014 (FR) ...................... 14 60174

(51) Int. Cl.
*B23Q 1/34* (2006.01)
*B23B 47/34* (2006.01)
(Continued)

(52) U.S. Cl.
CPC ............... *B23B 47/34* (2013.01); *B23Q 1/34* (2013.01); *B23Q 5/326* (2013.01); *B23Q 5/402* (2013.01);
(Continued)

(58) Field of Classification Search
CPC .............. B23B 47/34; B23B 2260/102; B23B 2260/108; B23Q 1/34; B23Q 5/326; B23Q 5/402; B23Q 2210/002
See application file for complete search history.

(56) References Cited

U.S. PATENT DOCUMENTS 5,342,152 A 8/1994 Medeksza .................... 408/1 R
2007/0209813 A1 9/2007 Veres ................................ 173/4
(Continued)

FOREIGN PATENT DOCUMENTS

EP 1 916 045 A1 4/2008
FR 2 907 695 A1 5/2008
(Continued)

OTHER PUBLICATIONS

International Search Report dated Jan. 28, 2016 in corresponding PCT International Application No. PCT/FR2015/052818.
(Continued)

*Primary Examiner* — Alan Snyder
(74) *Attorney, Agent, or Firm* — Ostrolenk Faber LLP

(57) ABSTRACT

A machining device including a framework, a transmission shaft and a drive mechanism including a rotation member for driving the shaft in rotation about its axis, a drive member in helical connection with the shaft to drive the translation thereof along its axis with a feed movement, according to the relative rotational speed of the rotation and drive members. The drive member is mounted with the ability to effect translational movement with respect to the framework along the axis and is positioned between the rotation member and an end for coupling of the shaft to a cutting tool, while an electromechanical actuator is mounted in a fixed frame of reference associated with the framework in front of the drive member to which it can be coupled in
(Continued)

order to cause it to oscillate translationally so as to superpose an axial oscillation component with the feed movement.

12 Claims, 2 Drawing Sheets

(51) Int. Cl.
    *B23Q 5/32*     (2006.01)
    *B23Q 5/40*     (2006.01)

(52) U.S. Cl.
    CPC ... *B23B 2260/102* (2013.01); *B23B 2260/108* (2013.01); *B23Q 2210/002* (2013.01)

(56) References Cited

U.S. PATENT DOCUMENTS

| | | | |
|---|---|---|---|
| 2011/0222975 A1 | 9/2011 | Short | 408/17 |
| 2015/0003928 A1* | 1/2015 | Laporte | B23B 41/06 |
| | | | 408/1 R |

FOREIGN PATENT DOCUMENTS

| | | |
|---|---|---|
| FR | 2 944 722 A1 | 10/2010 |
| FR | 2 952 563 A1 | 5/2011 |
| WO | WO 2013/088343 A1 | 6/2013 |

OTHER PUBLICATIONS

Written Opinion dated Jan. 28, 2016 in corresponding PCT International Application No. PCT/FR2015/052818.

* cited by examiner

VIBRATORY MACHINING DEVICE

CROSS-REFERENCE TO RELATED APPLICATIONS

The present application is a 35 U.S.C. §§ 371 national phase conversion of PCT/FR2015/052818, filed Oct. 20, 2015, which claims priority to French Patent Application No. 1460174, filed Oct 22, 2014, the contents of which are incorporated herein by reference. The PCT International Application was published in the French language.

TECHNICAL FIELD

The present invention relates to the field of devices for machining components, such as drilling devices and, more particularly, those that incorporate a feed movement for the cutting tool, for example for the drill bit.

BACKGROUND OF THE INVENTION

Such a device is well known to a person skilled in the art, in particular for example from the patent document FR 2 907 695, which describes a machine, referred to as a drilling unit, having a drive mechanism provided with a drive pinion that is mounted in a fixed manner in terms of rotation on a tool holding spindle so as to rotate the latter while allowing said drive pinion to move axially, and a feed pinion coupled to the tool-holding spindle by a helical connection so as to drive the spindle translationally along its axis, in a feed movement, depending on the relative rotational speed of the drive pinion and feed pinion.

Unlike numerical control machines or other drilling means that use electric motors, drilling units generally only have a (pneumatic or electric) motor which rotates the tool, via the drive mechanism, about its axis and simultaneously feeds it or returns it by translational movement along its axis. Since the translational and rotational movements are mechanically connected, the operational parameters of the drilling units are fixed by the choice of pinions and are constant throughout the drilling cycle. In particular the ratio between the rotational speed and the feed rate is imposed kinematically, thereby giving a constant feed per revolution, which therefore cannot be adapted optimally depending on the materials drilled. Thus, if such a machine proves to be generally satisfactory, it can prove tricky to use it to drill deep bores and/or multimaterial stacks.

Specifically, in this context, it can prove difficult to evacuate chips formed during drilling. If chips become jammed, this can result in the breakage of or significant wear to the drilling tool, deterioration of the state of the surfaces generated, more particularly during operations of drilling stacks made of different materials, or a significant drop in productivity, in particular by the limitations imposed by the cutting parameters such as the speed of rotation or the feed rate.

One remedy to this drawback consists in causing the breakup of these chips by varying the thickness thereof, by virtue of discontinuous drilling. Thus, the drilling machine described in the abovementioned patent document is provided with a system of displacing the feed pinion with respect to the framework of the machine, said system being in the form of a cam/cam follower assembly, a first of these elements being fixed in terms of rotation to the spindle and the other being fixed in terms of rotation to the feed pinion, making it possible to superpose an oscillation on the feed movement of the spindle along its axis during drilling. Thus, during the feed of the drilling tool, these axial oscillations vary the thickness of the chips, thereby allowing them to be broken up and evacuated. However, this results in friction at the cam, which causes heat, wear and noise. Moreover, the frequency of the oscillations depends on the relative speed of rotation between the feed pinion and the tool-holding spindle and does not always make it possible to obtain optimal oscillation frequencies for good breakup of the chips, since the number of oscillations per revolution remains constant. Consequently, such a machine could not be adapted to multiple machining configurations, for example to drilling with drill bits having two edges or with a single edge, for which the number of oscillations per revolution needs to be different. Moreover, the architectures proposed by the abovementioned patent did not make it possible to be able to stop oscillation excitation depending on the nature of the machining process. However, such a stop may become necessary, for example if the same tool needs to carry out drilling followed by the production of a bevel, the latter requiring a feed movement without superimposed oscillations. Further optimizations of the vibrating assistance for the breakup of the chips are also impossible with known principles, for example real-time variation, during the drilling operation, of the amplitude or the frequency of the imposed oscillations, or the generation of oscillation shapes other than a sinusoid, for example a sawtoothed oscillation shape.

SUMMARY OF THE INVENTION

Therefore, it is an aim of the present invention to propose an improved machining device, in particular a drilling device for breaking up chips during drilling by superposing axial oscillations on the feed movement of the tool, which does not have at least one of the abovementioned limitations and, in particular, is easy to implement, takes up little space and the oscillation characteristics of which are easily adaptable.

To this end, the subject of the present invention is a machining device comprising a framework, a transmission shaft that extends along an axis and is able to be coupled to a cutting tool, and a drive mechanism for driving the transmission shaft, said mechanism comprising a rotation member that is coupled to the transmission shaft and is able to drive the transmission shaft rotationally about its axis with respect to the framework, a drive member that is in helical connection with the transmission shaft and is able to drive the transmission shaft translationally along its axis in a feed movement with respect to the framework, depending on the relative rotational speed of said rotation member and drive member, and means for generating axial oscillations that are able to generate an oscillating feed movement of the transmission shaft along its axis.

According to the invention, said drive member is mounted so as to be able to move translationally along the axis with respect to said framework and is positioned between an end for coupling the transmission shaft to said cutting tool and said rotation member, said means for generating axial oscillations comprising an electromechanical actuator mounted in a fixed location, associated with said framework, in front of said drive member, to which said electromechanical actuator is able to be coupled in order to make it oscillate translationally, so as to superpose an axial oscillation component on said feed movement.

According to further advantageous features of the machining device in accordance with the invention, taken on their own or in combination:

said electromechanical actuator can be designed so as to generate an axial displacement movement of said drive member in an axial direction opposite to the direction of the feed movement, while a preloading spring urges said drive member in an axial direction corresponding to the direction of the feed movement;

alternatively, said electromechanical actuator can be designed so as to generate an axial displacement movement of said drive member in an axial direction corresponding to the direction of said feed movement, while a preloading spring urges said drive member in an axial direction opposite to the direction of the feed movement;

said axial displacement movement can advantageously be transmitted to said drive member by way of a mechanical amplification means that is able to amplify the amplitude of the movement generated by said electromechanical actuator;

said mechanical amplification means can comprise, according to one exemplary embodiment, a lever arm extending between a free end of said electromechanical actuator and said drive member;

the device preferably comprises a means for coupling to said drive member of the double thrust bearing type secured to said drive member;

said electromechanical actuator butts with one of its ends against an axial annular bearing fixed to said framework;

said axial annular bearing can advantageously comprise elastic damping means by way of which said end of said electromechanical actuator butts against said axial annular bearing;

said drive member is in a sliding connection in the direction of the axis with a drive sprocket for driving said drive member in rotation, said drive sprocket receiving a rotational movement and being in a pivoting connection with respect to said framework;

said sliding connection between said drive member and said drive sprocket in the direction of the axis is realized by elastic guide means;

said device can comprise a sliding pivot between said drive member and said framework;

said electromechanical actuator can be a piezoelectric or magnetostrictive or electrostrictive actuator.

BRIEF DESCRIPTION OF THE DRAWINGS

Further particular features and advantages of the invention will become apparent from reading the description given below of one particular embodiment of the invention, which is given by way of nonlimiting example, with reference to the appended drawings, in which.

In this regard, in the figures, it should be noted that elements bearing the same reference numerals correspond to identical or similar elements.

DESCRIPTION OF PREFERRED EMBODIMENTS

Figure 1:
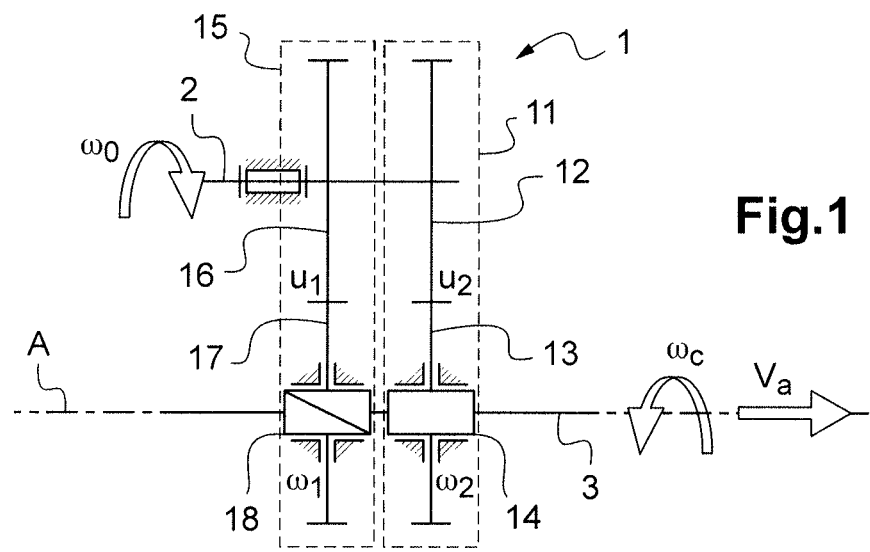
FIG. 1 is a diagram illustrating the kinematics of a drive mechanism for a drilling unit known as a drilling unit with a programmed feed, to which the invention can be applied in a nonlimiting manner.

FIG. 1 illustrates a conventional kinematic structure of a drilling device having a drive mechanism 1 that forms a drive mechanism known as a drive mechanism with a programmed feed, mechanically connecting an input transmission shaft 2 to an output transmission shaft 3 to which a cutting tool, in this case a drilling tool, is intended to be coupled. The shaft 2 of the drive mechanism is coupled to a drive motor or to a motor/reduction gear assembly. The assembly of these elements is housed at least partially in a framework of the drilling device and the output transmission shaft 3 is received in the framework so as to be movable rotationally about its axis A and translationally along this axis A.

According to the exemplary embodiment in FIG. 1, the drive mechanism 1 comprises a first gearing means 11, which makes it possible to convert the rotational movement of the input shaft 2 into a rotational movement of the output shaft 3. This first gearing means has for example a first drive sprocket 12, fixed to the input shaft 2, that engages with a rotation member 13 coupled to the output shaft 3 such that the rotation member 13 rotates with the output shaft 3 while allowing a translational movement of the latter along its axis A with respect to the rotation member 13, the connection between the rotation member 13 and the output transmission shaft 3 being for example a sliding connection 14, the output transmission shaft 3 being able to have grooves in which corresponding ribs on the rotation member 13 engage.

In accordance with the conventional drive mechanisms with a programmed mechanical feed, the drive mechanism 1 comprises a second gearing means 15 that makes it possible to convert the rotational movement of the input transmission shaft 2 into a feed movement of the output transmission shaft 3. This second gearing means 15 can comprise for example a first drive sprocket 16 that is coupled to the input shaft 2 and makes it possible to engage a second drive sprocket 17 in pivoting connection with the framework and fixed to a drive member 18 coupled to the output transmission shaft 3 by way of a helical connection that makes it possible to convert the rotational movement of the drive member 18 relative to the output transmission shaft 3 into a corresponding translational movement of the output transmission shaft 3 along its axis A with respect to the framework, such that the output transmission shaft 3 is fed along the axis A (in the direction of the arrow Va) with respect to the framework depending on the relative rotational speed of the rotation and drive members 13 and 18. Specifically, the helical connection converts the rotational relative movement between the drive member 18 and the output transmission shaft 3 into a translational movement. The judicious choice of the two transmission ratios u1 and u2, between the second drive sprocket 17 and the first drive sprocket 16 of the second gearing means 15 and between the first rotation member 13 and the first drive sprocket 12 of the first gearing means 11, respectively, will make it possible to obtain a low feed rate (a few hundredths of a millimeter) while implementing a helical connection with a pitch that is relatively large and easy to realize (a few millimeters).

Alternatively, the rotational movements of the rotation member 13 and drive member 17 can also be provided by two parallel kinematic chains, which are more complex than those shown above, which receive the drive movement from the same motor or motor/reduction gear pair, or from two different motors.

It was explained above that the chips that are formed during the drilling of a material can be evacuated more easily if they are broken up at the same time as they are formed. Conventionally, attempts are made to make this breakup possible by imposing an oscillating feed movement on the drilling tool coupled to the output transmission shaft 3, by superposing an oscillating movement on the feed movement generated by the drive member 18 via the helical connection with the output shaft 3.

The solutions proposed by the present invention for generating the oscillating feed movement can be applied to any machining device comprising a drive mechanism for driving the transmission shaft that has a kinematic chain as described with reference to FIG. 1, but can be applied, more widely, independently of the choice of kinematic chain designed to transmit movements to the output transmission shaft 3 and, in particular, designed to transmit the two rotational movements to the rotation member 13 and to the drive member 18, respectively. Thus, the solutions which will now be described can be applied to any kinematic chain using an output transmission shaft coupled to a rotation member that is able to drive the shaft rotationally about its axis inside a framework while leaving it free to move translationally, the framework housing a drive mechanism comprising a drive member coupled to the shaft by a helical connection so as to bring about the automatic feed of the shaft along its axis relative to the framework under the effect of the rotational driving of the shaft, regardless of the way in which the difference between the speed of rotation $\omega 1$ of the drive member and the speed of rotation $\omega 2$ of the rotation member is realized.

Figure 2:
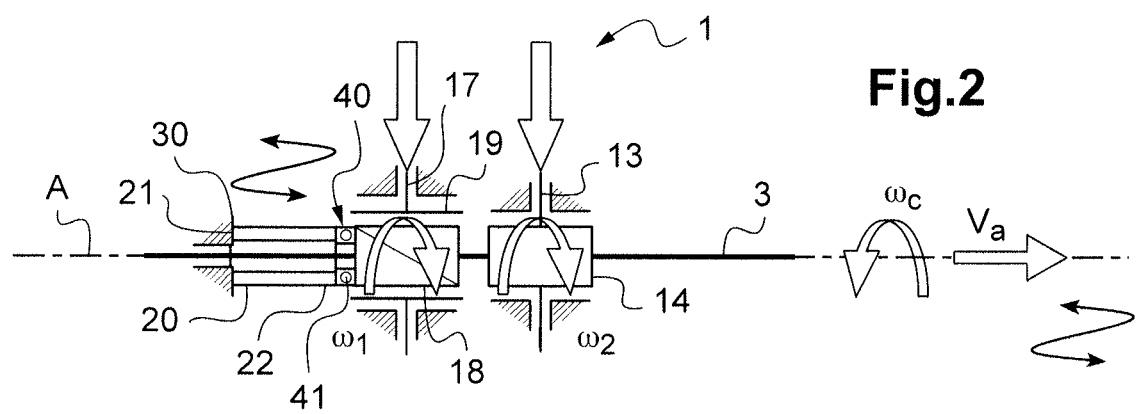
FIG. 2 is a diagram similar to FIG. 1, illustrating the arrangement of the guide part of the shaft according to a first embodiment of the invention, in order to combine the feed movement of the output transmission shaft with an oscillating movement along the axis.

The first embodiment illustrated in FIG. 2 has a configuration based on a machine architecture in which the drive member 18 forming the nut element of the helical connection with the shaft 3 is positioned in the rear part of the machine, as is conventionally the case in existing machines. In other words, the drive member 18 is positioned along the output transmission shaft 3 away from an end for coupling this shaft to the cutting tool (not shown) with respect to the rotation member 13.

The drive member 18, coupled to the output transmission shaft 3 by way of the helical connection, is able to move axially inside the framework along the axis A, the connection between the drive member 18 and the second drive sprocket 17 being, for example, a sliding connection 19 of axis A. This sliding connection 19 has the particular feature of having to ensure a low-amplitude travel, equal to the amplitude of the oscillations which will be imposed, typically around a tenth of a millimeter, preferably from 0.1 to 0.2 mm. Thus, although it can be realized by conventional means for a sliding connection (plain bearing, bearing pads having rolling elements etc.), it can also be realized by elastic guide means which can be similar to a sliding connection with a small travel. Alternatively, a sliding pivot that slides in the direction of the axis A can be arranged between the drive member 18 and the framework, such that the drive member 18, intended to impose the feed movement on the output transmission shaft 3, is able to move translationally with respect to the framework along the axis A. Moreover, the output transmission shaft 3 is fixed in terms of translational movement to the drive member 18 on account of the helical connection therebetween, the drive member 18 forming the nut element of this helical connection 18 that is screwed onto a threaded portion of the output shaft 3.

According to this first embodiment illustrated in FIG. 2, the means for generating axial oscillations that are intended to allow an oscillating feed movement of the output transmission shaft 3 along its axis A comprise an electromechanical actuator 20, for example of the piezoelectric type, the oscillations of which, which are brought about by a variable voltage applied thereto, are oriented along the axis A. The actuator 20 can also be of the magnetostrictive or electrostrictive type or of the type using any other type of medium and physical phenomena, for example electrohydraulic or electropneumatic, that are capable of providing an oscillation generated by an external control signal.

The electromechanical actuator 20, having a tubular shape, is mounted on the output transmission shaft 3 in the rear part of the machine, behind the drive member 18 that constitutes the nut element of the helical connection with the output transmission shaft 3, and is intended to be coupled axially to the drive member 18 in order to make it oscillate translationally along the axis A, when it is made to, so as to superpose an axial oscillation component on the feed movement of the shaft that is imposed by the drive member 18.

The electromechanical actuator 20 is advantageously mounted at a fixed location, connected to the framework, and in other words it does not rotate about the axis A of the output shaft 3 relative to the framework, thereby greatly simplifying its power supply, thus avoiding the necessity to use complex and expensive solutions, for example of the slip ring type based on sliding contacts. To this end, the electromechanical actuator 20 butts by way of one of its ends against an axial annular bearing 30 fixed to the framework, so as to leave the actuator 20 in a fixed location. The axial annular bearing 30 may comprise elastic damping means (not shown) interposed between the bearing itself and the end 21 of the electromechanical actuator 20 intended to butt against the bearing 30.

In front of the electromechanical actuator 20 that is mounted in a rotationally fixed manner about the axis A, an oscillating free end 22 of the actuator 20, which is situated away from the end 21 axially butting against the block 30 fixed to the framework, is intended to be coupled to the drive member 18 in order to make it oscillate translationally along the axis A through the sliding connection 19, so as to superpose an axial oscillation component on the uniform feed movement of the shaft 3 along the axis A, generated on the basis of the rotational relative movement between the drive member 18 and the output transmission shaft 3.

The drive member 18 is preferably mounted so as to be able to move axially with respect to the framework in the direction of the axis A by way of an elastic return mechanism (not shown) for returning the drive member 18 into a nominal axial position with respect to the framework. The elastic return mechanism, for example a preloading spring, associated with the sliding connection or with the sliding pivot, is designed to allow movements of the drive member 18 with respect to the framework in the direction of the feed movement of the tool from a nominal axial position under the effect of the axial displacement movement generated by the actuator 20, while urging the drive member 18 in an axial direction opposite to the direction of the feed movement. Therefore, the drive member 18 is urged to be coupled to the oscillating free end 22 of the actuator 20 by the elastic return mechanism.

According to this embodiment, the actuator 20 "pushes" the drive member 18 in the direction of the feed movement of the tool and the preloading spring generates the return force for withdrawing the tool from the material. Thus, drilling force peaks occur during the "outward" travel, when the tool passes into the material at a high speed and removes a chip of maximum thickness, while the return movement of the tool is realized under the effect of the preloading spring. The latter should advantageously be dimensioned so as to avoid any loss of contact with the actuator 20.

The coupling between the oscillating free end 22 of the electromechanical actuator 20 and the drive member 18 can be brought about by a coupling means 40 making it possible to limit friction between the oscillating free end 22 of the actuator 20, mounted in a rotationally fixed manner about the axis A, and the drive member 18 that is rotationally driven about the axis A. More specifically, the coupling means 40 can be of the double thrust bearing type comprising a fixed raceway, formed on a fixed race that is attached to the output shaft 3 in a movable manner with respect to the framework along the axis A and is intended to be joined to the oscillating free end 22 of the electromechanical actuator 20, and a rotating raceway, intended to be fixed to the drive member 18, while rotating elements are disposed between the fixed and rotating raceways. The rotating raceway can be formed either directly on the drive member 18 or on a rotating race attached to the drive member 18.

This machining device advantageously allows better control of the axial oscillations combined with the feed movement of the shaft, in particular because the electromechanical actuator used is controllable in real time by control means that react to a simple adjustment of the characteristics of its power supply. Thus, it is possible to regulate both the amplitude and frequency of the oscillations, including during an ongoing drilling operation, this being particularly advantageous for implementing an adaptive drilling process, in particular in order to take into account the various materials which are passed through in one and the same operation, or the particular configuration of the machining process, for example in the case of a combined operation in which drilling followed by beveling is carried out with a single tool.

Figure 3:
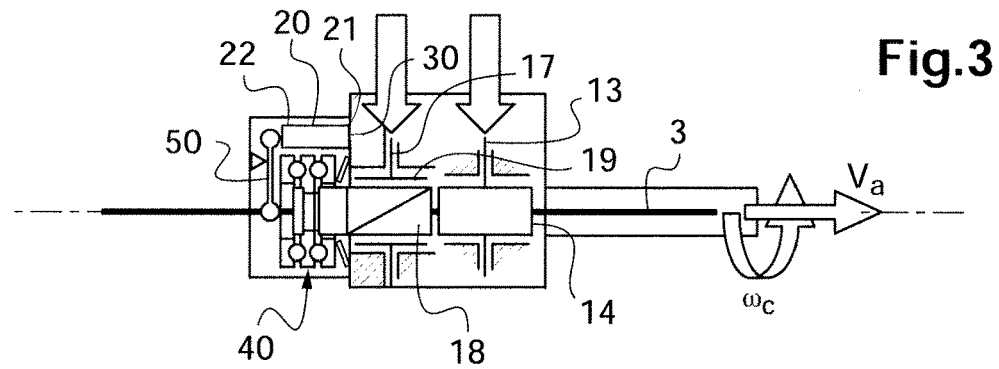
FIG. 3 is a diagram illustrating a variant of the embodiment illustrated in FIG. 2.

FIG. 3 illustrates a variant of the embodiment in FIG. 2, in which the actuation incorporates an amplification, by contrast to the direct actuation without amplification described in FIG. 2, so as to increase the amplitude of the oscillating movement generated by the actuator 20. In other words, the actuation with incorporated amplification allows a greater axial displacement travel for one and the same actuator. To this end, as illustrated in FIG. 3, the axial displacement movement generated by the actuator 20 is transmitted to the drive member 18 by way of a mechanical amplification means 50 that is able to amplify the amplitude of this movement and is interposed between the free end 22 of the actuator 20 and the double thrust bearing 40, while the actuator 20 is still mounted in a fixed location, associated with the framework. By way of example, the mechanical amplification means 50 comprises a lever arm mounted in a pivoting manner between the free end 22 of the actuator 20 and the fixed race of the double thrust bearing 40 attached to the output transmission shaft 3.

Such actuation with amplification as described in FIG. 3 advantageously makes it possible to increase the amplitude of the oscillations so as to ensure systematic fragmentation of the chips and makes it possible to cover a greater feed range per turn.

Figure 4:
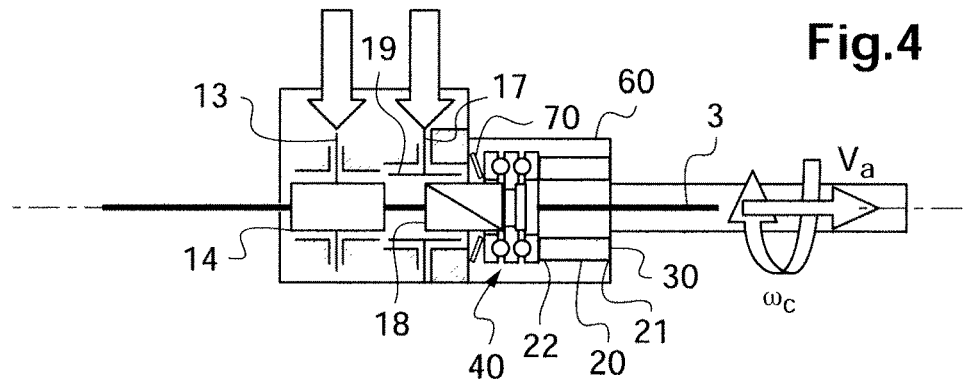
FIG. 4 is a diagram illustrating a second embodiment of the invention.

With reference to FIG. 4, a second embodiment is described having a configuration based on a machine architecture in which the drive member 18 forming the nut element of the helical connection is, this time, positioned in the front part of the machine. In other words, in this configuration, the drive member 18 is positioned along the output transmission shaft 3 between the end for coupling the transmission shaft to the cutting tool and the rotation member 13. In this particular configuration, as illustrated in FIG. 4, provision is made to position the actuator 20 in the front part 60 of the machine, also referred to as the nose of the machine, in front of the drive member 18. Thus, the actuator 20 is positioned in the nose of the machine, between the end for coupling the transmission shaft to the cutting tool and the drive member 18. Such positioning of the actuator is particularly advantageous in terms of space requirement and thus makes it possible to improve the compactness of the machine.

The electromechanical actuator 20 butts with one of its ends 21 against an axial annular bearing 30 fixed to the framework, at the nose 60 of the machine, at the end for coupling the transmission shaft to the cutting tool, so as to leave the actuator 20 in a fixed location, in the same way as explained above with reference to FIG. 1, and its free end 22, situated away from its end 21 at the second drive sprocket 17, is coupled to the drive member 18 by way of the double thrust bearing 40, so as to make it oscillate translationally along the axis A through the sliding connection 19.

In this configuration, the electromechanical actuator 20 is therefore designed so as to generate an axial displacement movement of the drive member 18 in an axial direction opposite to the direction of the feed movement of the tool (symbolized by the arrow $V_a$ in the figures), from a nominal axial position with respect to the framework, while a preloading spring 70 urges the drive member 18 in an axial direction corresponding to the direction of the feed movement. Thus, the direction of actuation in the embodiment in FIG. 4 is in the reverse direction compared with the direction of actuation in the embodiment in FIGS. 2 and 3, where the actuator 20 "pushes" in the direction of the feed movement of the tool. By contrast, in this case, the actuator 20 "pushes" in the opposite direction to the feed movement of the tool. The preloading spring 70 thus has to be sufficiently stiff to be able to "return" the tool into the material, without causing harmful phenomena (such as instabilities, for example).

The embodiment in FIG. 4 is more particularly suitable for a vibrating assistance mode that consists in superposing oscillations with a non-sinusoidal shape and, more specifically, sawtooth-shaped oscillations. Specifically, in this configuration, the actuator 20 uses all of its power to drive the drive member 18 in a direction opposite to the feed movement of the tool and thus to generate a return travel of the tool which is much more rapid than the return of the tool into the material that is ensured by the preloading spring 70. In this way, the gradient of the path over the active travel of the tool, corresponding to the chip forming phase when the tool is returned into the material, will be lower than for a vibrating assistance mode in which the oscillations have a sinusoidal shape, thereby reducing the cutting forces and the wear to the tool. Moreover, the optimum oscillation frequency for vibrating assistance of the sawtooth type is lower than that which is necessary in the case of oscillations with a sinusoidal shape.

Figure 5:
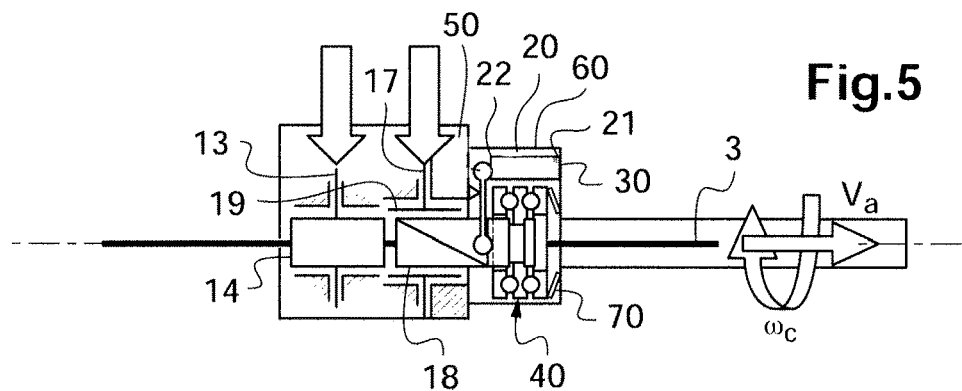
FIG. 5 is a diagram illustrating a third embodiment of the invention.

The embodiment illustrated in FIG. 5 is based on the same machine architecture as that described with reference to FIG. 4 and also relates to positioning of the actuator 20 in the nose 60 of the machine, in front of the drive member 18.

However, the direction of actuation is reversed compared with the direction of actuation in FIG. 4 and the actuation incorporates an amplification so as to increase the amplitude of the oscillating movement generated by the actuator 20, on the principle of the embodiment described with reference to FIG. 3.

To this end, the actuator 20 is still mounted in a fixed location, associated with the framework of the machine, butting with one of its ends 21 against an axial annular bearing 30 fixed to the framework, at the nose 60 of the machine, at the end for coupling the transmission shaft to the cutting tool, and the axial displacement movement generated by the actuator 20 is transmitted to the drive member 18 by way of a lever arm 50 (in accordance with the example in FIG. 3) mounted in a pivoting manner between the second drive sprocket 17 and the free end 22 of the actuator 20, situated substantially at right angles to the second drive sprocket 17 away from the first end 21. In this way, the actuator makes it possible to generate an axial displacement movement of the drive member 18 in an axial direction corresponding to the direction of the feed movement of the tool from a nominal axial position with respect to the framework, while the preloading spring 70 urges the drive member 18 in an axial direction opposite to the direction of the feed movement. To this end, the preloading spring 70 is arranged in the nose of the machine away from the drive member 18 with respect to the double thrust bearing 40 mounted in a fixed manner at the front of the drive member 18 and is preloaded against the double thrust bearing 40 so as to generate the return force for withdrawing the tool from the material.

The embodiment in FIG. 5 with the actuation housed in the nose of the machine thus still has a positive impact in terms of space requirement and, although it is not particularly optimal for implementing vibrating assistance with sawtooth oscillations, unlike the embodiment in FIG. 4, it can advantageously provide amplitudes of oscillations that are multiplied by the amplification factor permitted by the mechanical amplification means interposed between the actuator and the drive member 18.

Figure 6:
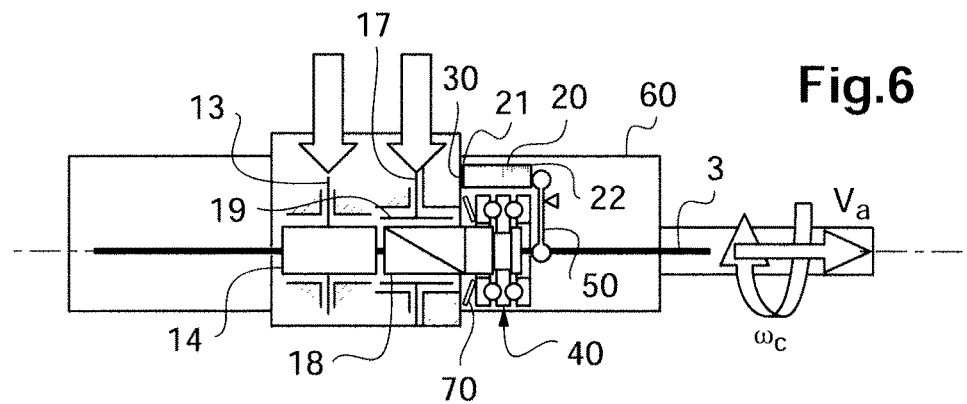
FIG. 6 is a diagram illustrating a fourth embodiment of the invention.

The embodiment in FIG. 6 is still based on the machine architecture described in FIGS. 4 and 5, with the drive member 18 positioned at the front of the machine with respect to the rotation member 13 and also relates to positioning of the actuator 20 in the nose 60 of the machine, in front of the drive member 18. This embodiment also combines the advantages associated with the reverse arrangement of the actuating direction (FIG. 4) and the implementation of an amplification of the amplitude of the movement generated (FIG. 5). To this end, the actuator 20 is mounted in a fixed location, associated with the framework of the machine, butting with one of its ends 21 against an axial annular bearing 30 fixed to the framework, at the nose 60 of the machine, by the drive member 18, and extends in the nose of the machine substantially at right angles to the double thrust bearing 40 mounted in front of the drive member 18. According to the embodiment, a lever arm 50 is mounted in a pivoting manner between the free end 22 of the actuator 20 and the fixed race of the double thrust bearing 40 mounted so as to be able to move translationally on the output transmission shaft 3. Thus, the actuator 20 makes it possible to generate an axial displacement movement of the drive member 18 in a direction opposite to the direction of the feed movement of the tool and this axial displacement movement generated by the actuator 20 is transmitted to the drive member 18 by way of the lever arm 50. In this way, the actuator is able to "push" the drive member 18 in a direction opposite to the direction of the feed movement of the tool with a movement amplitude amplified by the lever arm 50, and the preloading spring 70 urges the drive member 18 in the opposite direction. To this end, the preloading spring 70 is arranged in the nose of the machine by the drive member 18 and is preloaded against the rotating race of the double thrust bearing 40 attached to the drive member 18 so as to generate the force for returning the tool into the material.

The various embodiments of the invention, as have just been described for combining the feed movement of the output transmission shaft with an oscillating movement along its axis, could be easily adapted to any type of machining unit, given that operations other than drilling remain possible and inasmuch as the means used to generate the axial oscillations intervene only in the guiding part of the shaft, independently of the kinematic chain which provides the two rotational movements to the rotation member 13 for rotationally driving the shaft about its axis and to the drive member 18 for translationally driving the shaft along its axis, respectively. Thus, the solution proposed could be used for example in the design of a machining means of the electric spindle type, thereby gaining the advantage of integrating the feed movement into said machining means and of vibrating assistance. Generally, the invention is applicable to any industrial field in which a tool or tooling has to be made to move in rotation (at a constant or nonconstant speed), associated with a feed movement (of constant or nonconstant speed) and an oscillating movement (vibrations of variable frequency, amplitude and waveform), all of the parameters of these movements being able to be regulated independently, outside of or during the process.

The invention claimed is:

1. A machining device comprising a framework, a transmission shaft that extends along an axis and is able to be coupled to a cutting tool, and a drive mechanism for driving the transmission shaft, said mechanism comprising a rotation member that is coupled to the transmission shaft and is able to drive the transmission shaft rotationally about its axis with respect to the framework, a drive member that is in helical connection with the transmission shaft and is able to drive the transmission shaft translationally along its axis in a feed movement with respect to the framework, depending on the relative rotational speed of said rotation member and drive member, and means for generating axial oscillations that are able to generate an oscillating feed movement of the transmission shaft along its axis, characterized in that said drive member is mounted so as to be able to move translationally along the axis with respect to said framework and is positioned between an end for coupling the transmission shaft to said cutting tool and said rotation member, said means for generating axial oscillations comprising an electromechanical actuator mounted in a fixed location, associated with said framework, in front of said drive member to which said electromechanical actuator is able to be coupled in order to make it oscillate translationally, so as to superpose an axial oscillation component on said feed movement.

2. The device according to claim 1, wherein said electromechanical actuator is designed so as to generate an axial displacement movement of said drive member in an axial direction opposite to the direction of the feed movement, while a preloading spring urges said drive member in an axial direction corresponding to the direction of the feed movement.

3. The device according to claim 1, wherein said electromechanical actuator is designed so as to generate an axial displacement movement of said drive member in an axial direction corresponding to the direction of said feed movement, while a preloading spring urges said drive member in an axial direction opposite to the direction of the feed movement.

4. The device according to claim 2, wherein said axial displacement movement is transmitted to said drive member by way of a mechanical amplification means that is able to amplify the amplitude of the movement generated by said electromechanical actuator.

5. The device according to claim 4, wherein said mechanical amplification means comprises a lever aim extending between a free end of said electromechanical actuator and said drive member.

6. The device according to claim 1, further comprising a means for coupling to said drive member of the double thrust bearing type secured to said drive member.

7. The device according to claim 1, wherein said electromechanical actuator butts with one of its ends against an axial annular bearing fixed to said framework.

8. The device according to claim 7, wherein said axial annular bearing comprises elastic damping means by way of which said end of said electromechanical actuator butts against said axial annular bearing.

9. The device according to claim 1, wherein said drive member is in a sliding connection in the direction of the axis with a drive sprocket for driving said drive member in rotation, said drive sprocket receiving a rotational movement and being in a pivoting connection with respect to said framework.

10. The device according to claim 9, wherein said sliding connection between said drive member and said drive sprocket in the direction of the axis is realized by elastic guide means.

11. The device according to claim 1, further comprising a sliding pivot between said drive member and said framework.

12. The device according to claim 1, wherein said electromechanical actuator is a piezoelectric or magnetostrictive or electrostrictive actuator.

* * * * *